US009694650B1

(12) United States Patent
Ohshita et al.

(10) Patent No.: US 9,694,650 B1
(45) Date of Patent: Jul. 4, 2017

(54) VENTILATION MEMBER AND DOOR OF UTILITY VEHICLE WITH THE VENTILATION MEMBER

(71) Applicant: KAWASAKI JUKOGYO KABUSHIKI KAISHA, Hyogo (JP)

(72) Inventors: Yuji Ohshita, Osaka (JP); Koichi Egami, Akashi (JP); Masato Kinoshita, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 1 day.

(21) Appl. No.: 14/984,112

(22) Filed: Dec. 30, 2015

(51) Int. Cl.
| | | |
|---|---|---|
| *B60J 1/20* | (2006.01) |
| *B60H 1/24* | (2006.01) |
| *E06B 7/02* | (2006.01) |
| *B60H 1/26* | (2006.01) |
| *B60H 1/00* | (2006.01) |

(52) U.S. Cl.
CPC ......... *B60H 1/243* (2013.01); *B60H 1/00407* (2013.01); *B60H 1/265* (2013.01); *E06B 7/02* (2013.01)

(58) Field of Classification Search
CPC ......... A01B 35/20; A01B 43/00; A01B 49/02; B67D 9/02; E01C 11/126; H01L 2924/00014; H01L 2924/00; H05K 13/0417; C07C 5/2775; F16D 31/02
USPC ....................................................... 296/152
See application file for complete search history.

(56) References Cited

U.S. PATENT DOCUMENTS

| | | | | |
|---|---|---|---|---|
| 3,195,440 A | * | 7/1965 | Coscione ................. | B60H 1/26 454/145 |
| 3,391,628 A | * | 7/1968 | Ziegenfelder .......... | B60H 1/248 454/164 |
| 3,405,968 A | * | 10/1968 | Feles ...................... | B60H 1/248 454/164 |
| 3,805,684 A | * | 4/1974 | Atkinson ............... | B60H 1/247 454/164 |
| 5,492,505 A | * | 2/1996 | Bell ........................ | B60H 1/249 137/855 |
| 6,026,852 A | * | 2/2000 | Barton ................ | B29C 45/0062 137/512.1 |
| 6,210,266 B1 | * | 4/2001 | Barton ................ | B29C 45/1676 137/855 |
| 6,273,127 B1 | * | 8/2001 | Wade ..................... | B60H 1/249 137/512.15 |
| 8,651,924 B1 | * | 2/2014 | Jones ..................... | B64D 13/02 244/118.5 |
| 8,821,224 B2 | * | 9/2014 | Alexander ............. | B60H 1/249 454/162 |
| 8,827,357 B2 | | 9/2014 | Kaku et al. | |
| 8,986,086 B2 | * | 3/2015 | Carlson ................ | B60H 1/249 292/1 |

(Continued)

*Primary Examiner* — Kiran B Patel
(74) *Attorney, Agent, or Firm* — Wenderoth, Lind & Ponack, L.L.P.

(57) ABSTRACT

The invention provides a ventilation member attached to a wall member having a wall opening. The ventilation member includes: an outer surface member attached to an outer surface of the wall member to cover the wall opening; and an inner surface member attached to an inner surface of the wall member to cover the wall opening and coupled to the outer surface member. The outer surface member and the inner surface member are configured as identical members and each have an opening and at least one fin provided in the opening.

5 Claims, 7 Drawing Sheets

(56) References Cited

U.S. PATENT DOCUMENTS

| | | | |
|---|---|---|---|
| 9,097,353 B2* | 8/2015 | Loewe | B60H 1/249 |
| 9,321,326 B2* | 4/2016 | Carlson | B60H 1/249 |
| 2002/0073626 A1* | 6/2002 | Ringger | B60J 5/0419 |
| | | | 49/502 |
| 2008/0186158 A1* | 8/2008 | Shoemaker | B60H 1/249 |
| | | | 340/459 |
| 2014/0199933 A1* | 7/2014 | Wissmueller | B60H 1/249 |
| | | | 454/162 |
| 2015/0328958 A1* | 11/2015 | Winget, Jr. | B60H 1/00742 |
| | | | 454/155 |

* cited by examiner

VENTILATION MEMBER AND DOOR OF UTILITY VEHICLE WITH THE VENTILATION MEMBER

BACKGROUND OF THE INVENTION

1. Field of the Invention

The present invention relates to a ventilation member and a door of a utility vehicle provided with the ventilation member.

2. Description of the Related Art

As disclosed in U.S. Pat. No. 8,827,357, a door of a utility vehicle conventionally has a plate shape and enables no ventilation through the door.

SUMMARY OF THE INVENTION

A door of a utility vehicle typically partitions the lower half between a riding space and the exterior of a vehicle lateral end. When the door is closed, heat tends to be retained in the vehicle, particularly in a lower area in the vehicle and the thermal environment in the vehicle is difficult to be adjusted.

In view of the above, an object of the present invention is to provide a ventilation member that enables adjustment of the thermal environment in an internal space formed by a wall member to which the ventilation member is attached.

In order to achieve the above object, a first aspect of the present invention provides a ventilation member attached to a wall member having a wall opening, the ventilation member including:

an outer surface member attached to an outer surface of the wall member to cover the wall opening; and an inner surface member attached to an inner surface of the wall member to cover the wall opening and coupled to the outer surface member; wherein the outer surface member and the inner surface member are configured as identical members and each have an opening and at least one fin provided in the opening.

In the above configuration, the outer surface member and the inner surface member are each provided, in the opening, with the fin, so as to achieve promoted ventilation via the ventilation member and effectively prevent heat retention in the internal space formed by the wall member to which the ventilation member is attached. Furthermore, the outer surface member and the inner surface member are configured as the identical members. The outer surface member and the inner surface member can thus be produced using an identical cast to reduce production cost for the outer surface member and the inner surface member. The identical member is applicable as any one of the outer surface member and the inner surface member, so that the outer surface member and the inner surface member can be utilized effectively.

The ventilation member according to the first aspect of the present invention is preferred to further include any of the following configurations.

(1) In a state where the ventilation member is attached, the fin is attached to the opening to be extended backward and slanted from inside to outside the wall member.

(2) The wall member is a door of a utility vehicle.

In the configuration (1), the fin is extended backward and slanted from inside to outside the wall member. Further promoted ventilation via the ventilation member is achieved particularly in a case where the wall member shifts forward.

The configuration (2) prevents heat retention in the utility vehicle.

A second aspect of the present invention provides a door of a utility vehicle to which the ventilation member according to the first aspect is attached, wherein the wall opening is provided in a flat portion located in a vertical center of the door.

The above configuration facilitates attachment of the ventilation member to the wall opening.

The door of a utility vehicle according to the second aspect of the present invention is preferred to further include the following configuration.

(3) The door has a symmetrical shape with respect to a center in a vehicle width direction to be applicable as either a right door or a left door.

In the configuration (3), the door is applicable as either a right door or a left door. The right door and the left door can thus be produced using an identical cast to reduce production cost for the doors. Furthermore, the door is applicable to both of the left door and the right door, so that the door can be utilized effectively.

In summary, the present invention provides a ventilation member that enables adjustment of the thermal environment in an internal space formed by a wall member to which the ventilation member is attached.

DETAILED DESCRIPTION OF THE INVENTION

[Entire Structure of Vehicle]

Figure 1:
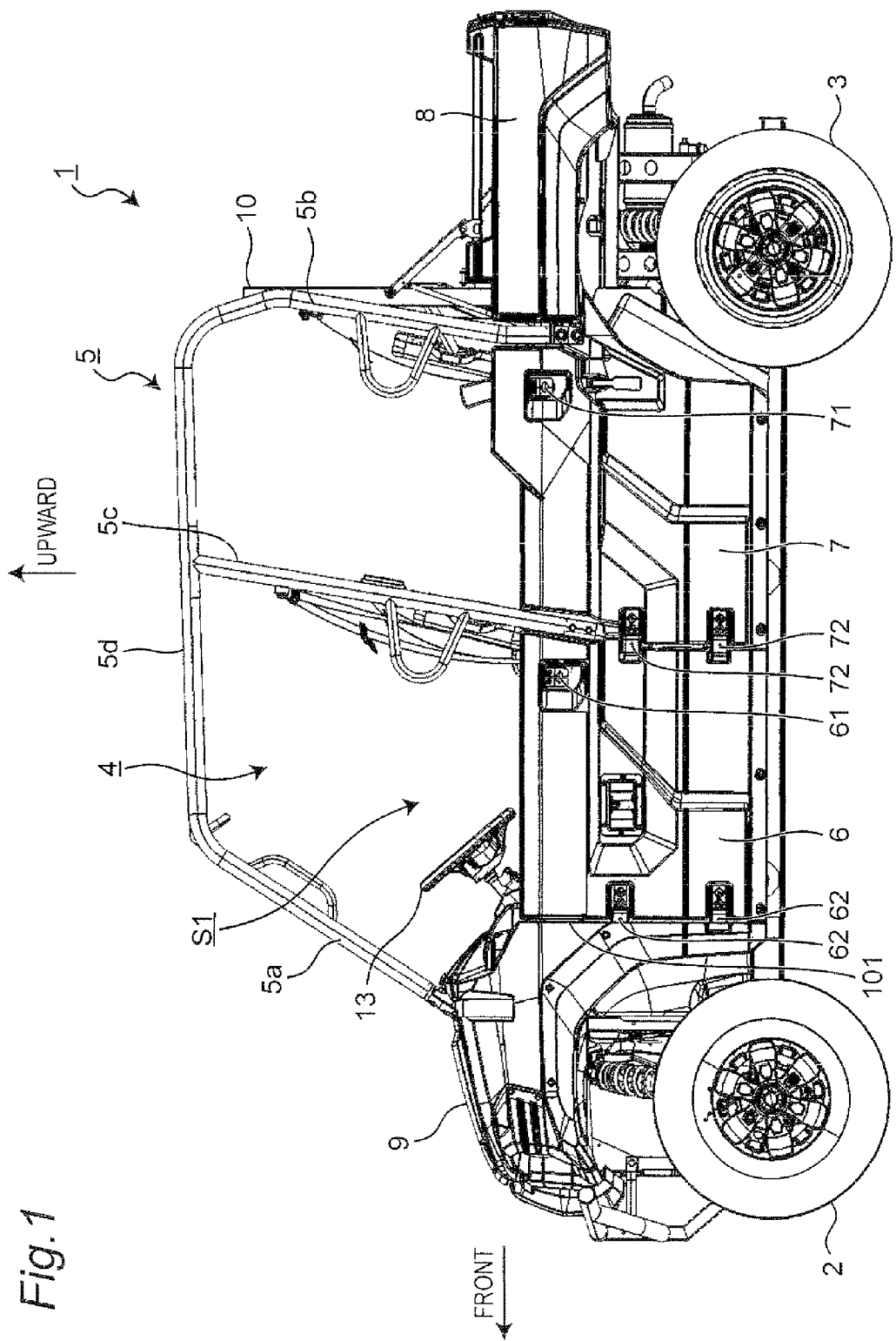
FIG. 1 is a left side view of a utility vehicle provided with a ventilation member according to an embodiment of the present invention.
Figure 2:
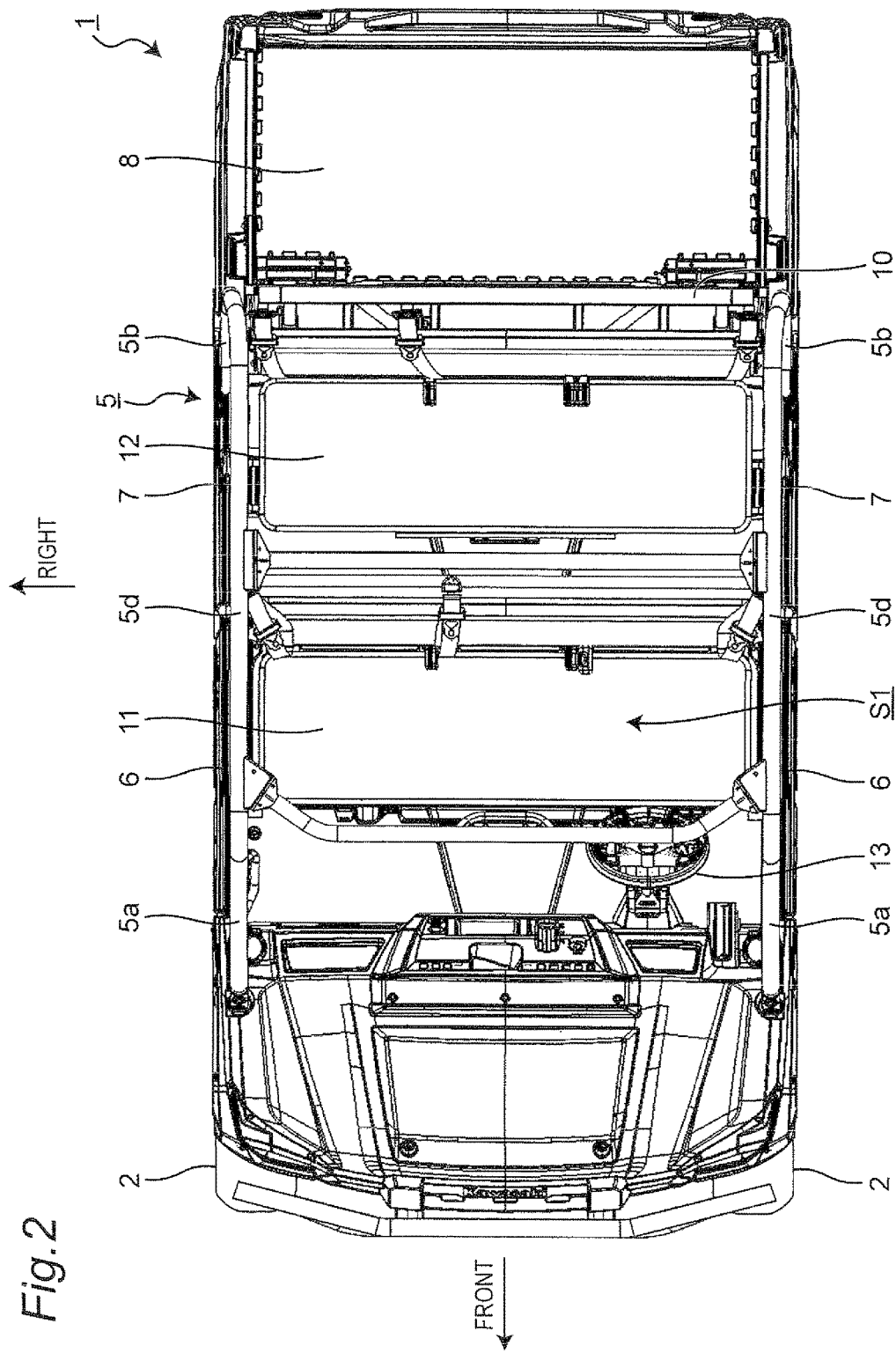
FIG. 2 is a top view of the utility vehicle shown in FIG. 1.

FIG. 1 is a left side view of a utility vehicle provided with a ventilation member according to an embodiment of the present invention. Assume that the concept of directions according to the present embodiment matches the concept of directions viewed from a driver of the utility vehicle. FIG. 2 is a top view of the utility vehicle shown in FIG. 1.

As shown in FIGS. 1 and 2, a utility vehicle 1 includes a pair of right and left front wheels 2 at a vehicle front portion, a pair of right and left rear wheels 3 at a vehicle rear portion, and a riding space (cabin) 4 between the front wheels 2 and the rear wheels 3. The riding space 4 is surrounded with a ROPS 5, a pair of right and left front doors 6, and a pair of right and left rear doors 7. The ROPS is an abbreviation for a rollover protective structure. The ROPS 5 configures part of a chassis frame, and includes a pair of right and left front vertical members 5a, a pair of right and left rear vertical members 5b, a pair of right and left intermediate vertical members 5c provided between the front vertical members 5a and the rear vertical members 5b, and a plurality of upper end beam members 5d connecting the upper ends of the vertical members 5a, 5b, and 5c.

The riding space 4 is provided therebehind with a cargo bed 8, and is provided, at the front portion, with a bonnet 9. The cargo bed 8 is provided, at the front end, with a screen 10 that partitions between the riding space 4 and the cargo bed 8. The front half of the riding space 4 is provided with a front bench seat 11 and the rear half of the riding space 4 is provided with a rear bench seat 12. The front seat 11 has a left seat region S1 serving as a driver's seat. The left seat region S1 is provided, at the front portion, with an operation unit including a steering wheel 13 and the like.

Each of the front doors 6 includes a grip portion 61 configured to be gripped to open and close the front door 6 and hinge portions 62. The grip portion 61 is provided on the outer surface of an upper rear portion of the front door 6, and a crew grips the grip portion 61 to open and close the front door 6. The grip portion 61 has a lock function of locking the front door 6 to a closed state.

There are provided two hinge portions 62 vertically aligned at the front end of the front door 6, and the front door 6 is attached, via the hinge portions 62, to a front frame 101 supporting the bonnet 9. The front door 6 can be opened outward in the vehicle width direction about a rotational axis configured by the hinge portions 62.

Each of the rear doors 7 includes a grip portion 71 configured to be gripped to open and close the rear door 7 and hinge portions 72. The grip portion 71 is provided on the outer surface of an upper rear portion of the rear door 7, and a crew grips the grip portion 71 to open and close the rear door 7. The grip portion 71 has a lock function of locking the rear door 7 to a closed state.

There are provided two hinge portions 72 vertically aligned at the front end of the rear door 7, and the rear door 7 is attached to the intermediate vertical member 5c of the ROPS 5 via the hinge portions 72. The rear door 7 can be opened outward in the vehicle width direction about a rotational axis configured by the hinge portions 72.

[Structure of Front Door]

Figure 3:
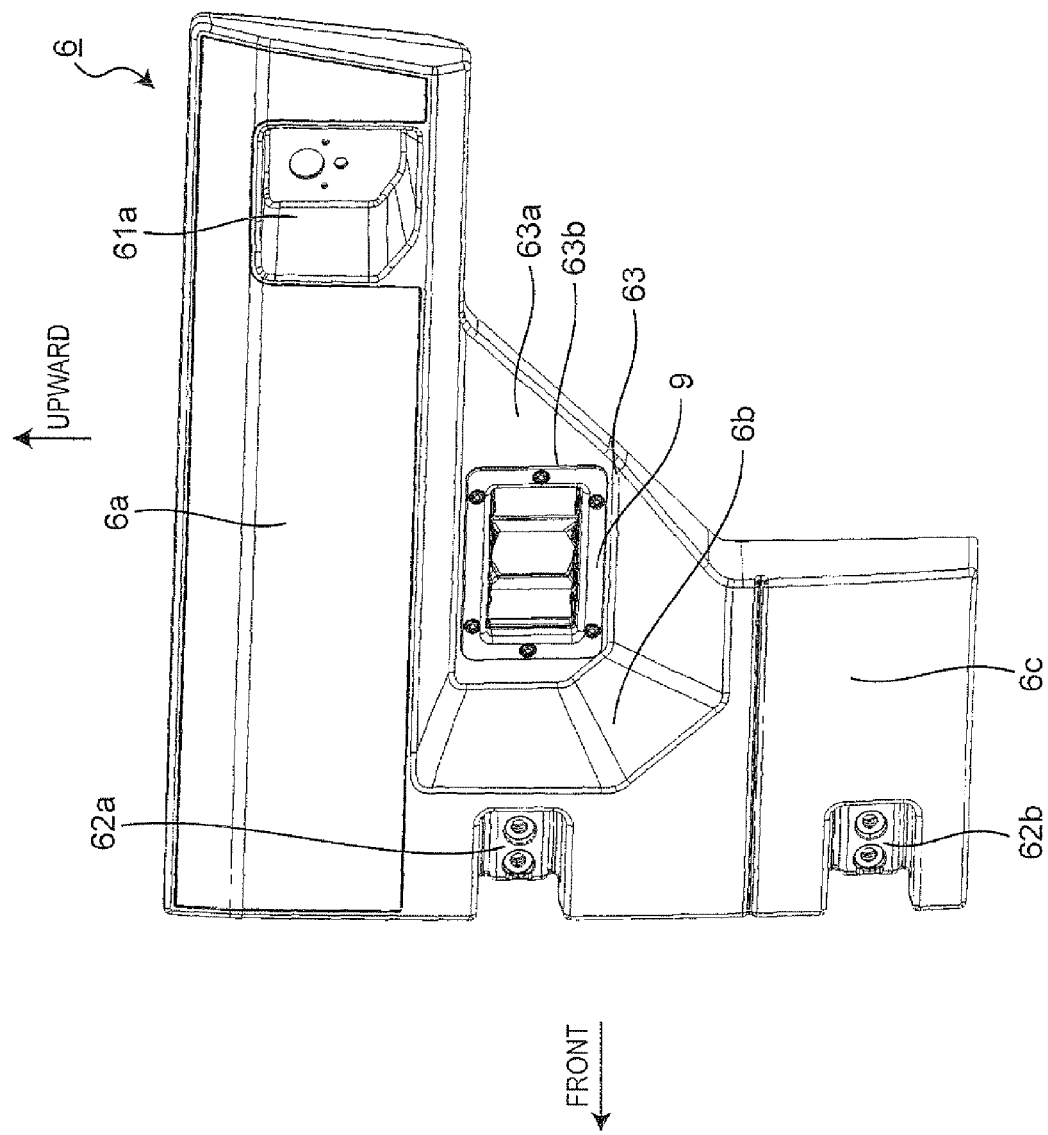
FIG. 3 is a left perspective view of a (left) front door.
Figure 4:
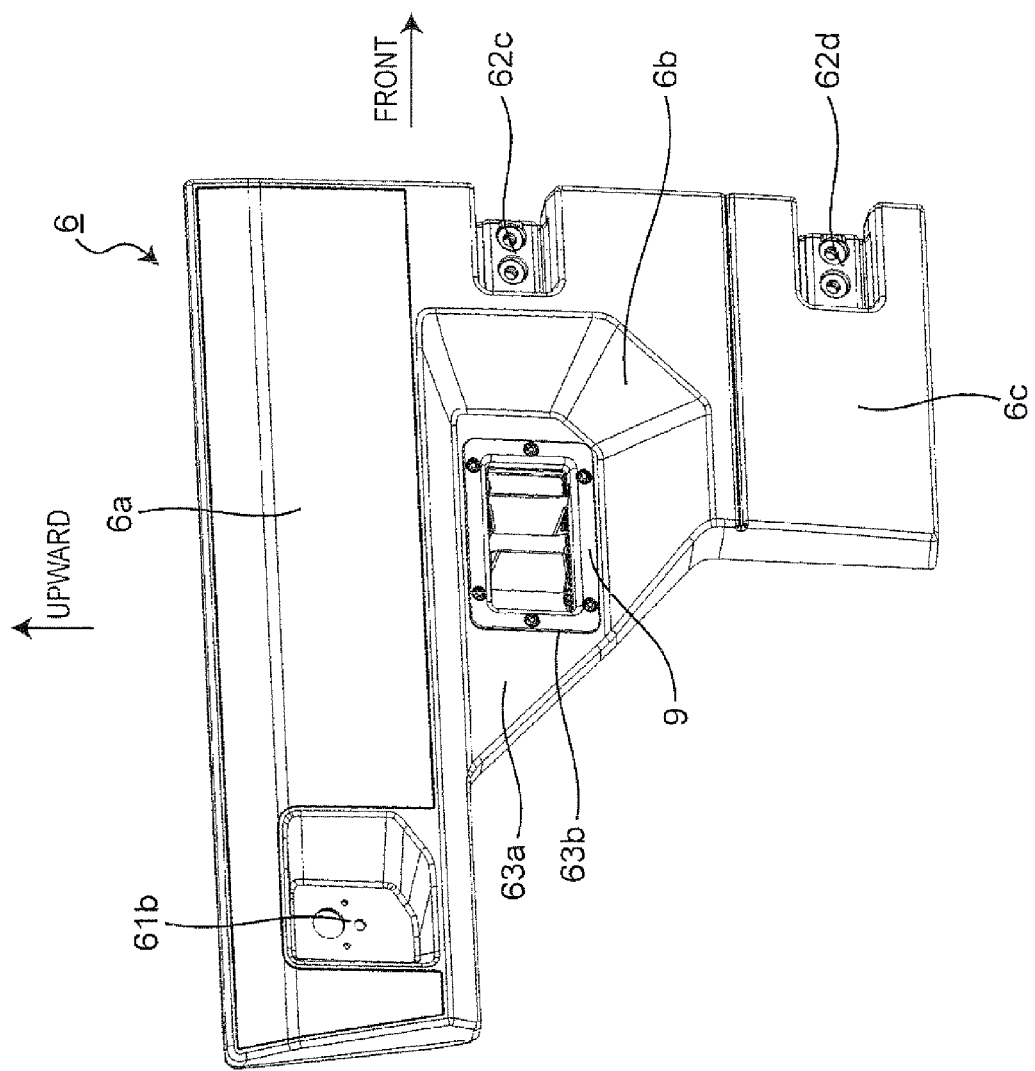
FIG. 4 is a right perspective view of the (left) front door.

FIG. 3 is a left perspective view of the (left) front door 6, and FIG. 4 is a right perspective view of the (left) front door 6. The left front door 6 is exemplified herein. The right front door is configured similarly to the left front door. FIG. 3 shows a state where the grip portion 61 and the hinge portions 62 are detached.

The front door 6 integrally includes from the top to the bottom, an upper section 6a having a rectangular shape in a side view, a middle section 6b having a trapezoidal shape in a side view, and a lower section 6c having a rectangular shape in a side view. The upper section 6a is provided, in a rear outer surface, with a grip portion recess 61a that is dented inward in the vehicle width direction so as to allow the grip portion 61 to be attached thereto. The grip portion recess 61a is located behind the rear end of the middle section 6b. The middle section 6b has the trapezoidal shape with an upper long side and a lower short side, and is provided, at the front end, with a hinge recess 62a that is dented inward in the vehicle width direction so as to allow one of the hinge portions 62 to be attached thereto. The lower section 6c has an anteroposterior length equal to the length of the short side of the middle section 6b, and is provided, at the front end, with a hinge recess 62b that is dented inward in the vehicle width direction so as to allow the other one of the hinge portions 62 to be attached thereto.

The middle section 6b is provided, behind the hinge recess 62a, with a recess 63 dented inward in the vehicle width direction. The recess 63 has a bottom surface located inside in the vehicle width direction and configured as a flat portion 63a that has a flat surface substantially perpendicular to the horizontal plane. The flat portion 63a is provided with an opening 63b penetrating in the vehicle width direction. The opening 63b has a ventilation member 9 attached thereto.

As shown in FIGS. 3 and 4, the front door 6 has a symmetrical shape with respect to its center in the vehicle width direction so as to be applicable as either a right door or a left door. Specifically, FIG. 4 is a view from a right side (inside the vehicle) of the (left) front door 6. When the front door 6 is applied as the left front door, no grip portion is attached to a grip portion recess 61b and no hinge portions are attached to hinge recesses 62c and 62d. In contrast, when the front door 6 shown in FIGS. 3 and 4 is applied as the right front door, FIG. 4 is the right perspective view of the (right) front door and FIG. 3 is the left perspective view of the (right) front door. In this case, the grip portion is attached to the grip portion recess 61b shown in FIG. 4 and the hinge portions are attached to the hinge recesses 62c and 62d. Meanwhile, no grip portion is attached to the grip portion recess 61a shown in FIG. 3 and no hinge portions are attached to the hinge recesses 62a and 62b. Similarly to the front door 6, the rear door 7 has a symmetrical shape with respect to its center in the vehicle width direction so as to be applicable as either a right door or a left door. The grip portion and the hinge portions are attached respectively to the grip portion recess and the hinge recesses in the rear door 7 similarly to the front door 6.

[Structure of Ventilation Member]

Figure 5:
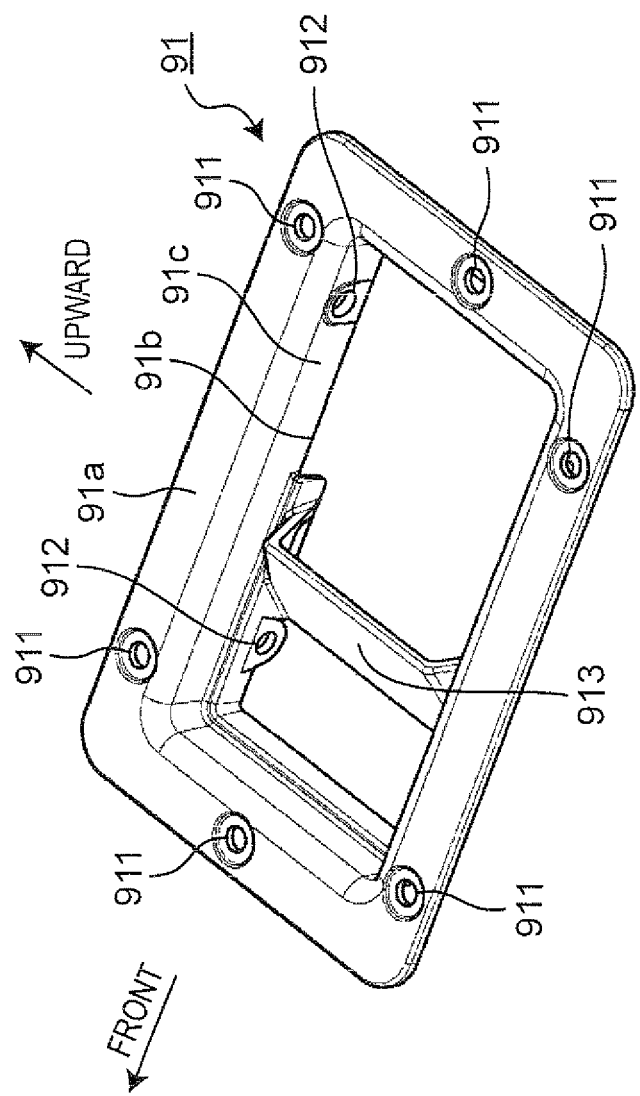
FIG. 5 is a perspective view of an outer surface member attached to an outer surface of a middle section to cover an opening in the (left) front door.
Figure 6:
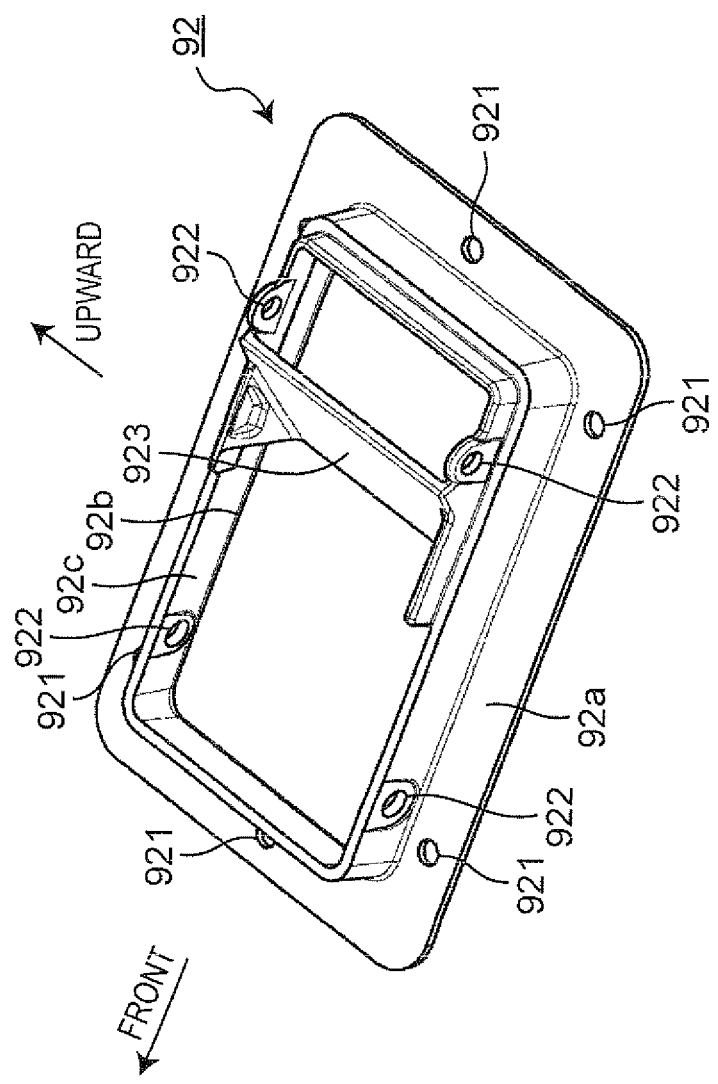
FIG. 6 is a perspective view of an inner surface member attached to an inner surface of the middle section to cover the opening in the (left) front door.

As described above, the ventilation member 9 is attached to the opening 63b that is provided in the flat portion 63a in the middle section 6b of the front door 6. FIG. 5 is a perspective view of an outer surface member 91 attached to the outer surface of the middle section 6b to cover the opening 63b in the (left) front door 6. FIG. 6 is a perspective view of an inner surface member 92 attached to the inner surface of the middle section 6b to cover the opening 63b in the (left) front door 6. The ventilation member 9 includes the outer surface member 91 and the inner surface member 92. As shown in FIGS. 5 and 6, the outer surface member 91 and the inner surface member 92 are configured as identical members. The outer surface member 91 and the inner surface member 92 shown in FIGS. 5 and 6 are each applicable as an outer surface member or an inner surface member. FIG. 6 can thus be regarded as an inner perspective view of the outer surface member 91 shown in FIG. 5. For easier description, the member shown in FIG. 5 will be referred to as the outer surface member 91 and the member shown in FIG. 6 will be referred to as the inner surface member 92.

As shown in FIGS. 5 and 6, the outer surface member 91 and the inner surface member 92 each have a rectangular shape with an anteroposterior side longer than a vertical side. The outer surface member 91 and the inner surface member 92 have outer peripheral portions 91a and 92a provided with a plurality of holes 911 and 921 penetrating in the vehicle width direction. The flat portion 63a in the middle section 6b of the front door 6 is provided with holes corresponding to the holes 911 and 921. Bolts inserted through the holes 911 and 921 as well as the holes corresponding to the holes 911 and 921 in the flat portion 63a fix the outer surface member 91, the inner surface member 92, and the flat portion 63a that is sandwiched between the outer surface member 91 and the inner surface member 92.

The outer surface member 91 and the inner surface member 92 are provided, inside the outer peripheral portions 91a and 92a, with openings 91b and 92b each of which has a rectangular shape with an anteroposterior side longer than a vertical side and penetrates in the vehicle width direction. The openings 91b and 92b have shapes substantially similar to the outer shapes of the outer surface member 91 and the inner surface member 92, respectively. Edges 91c and 92c shaping the openings 91b and 92b are provided with a plurality of vertically penetrating holes 912 and 922, respectively. The outer surface member 91 and the inner surface member 92 are directly coupled to each other by rivets penetrating the holes 912 and 922 at these positions.

Figure 7:
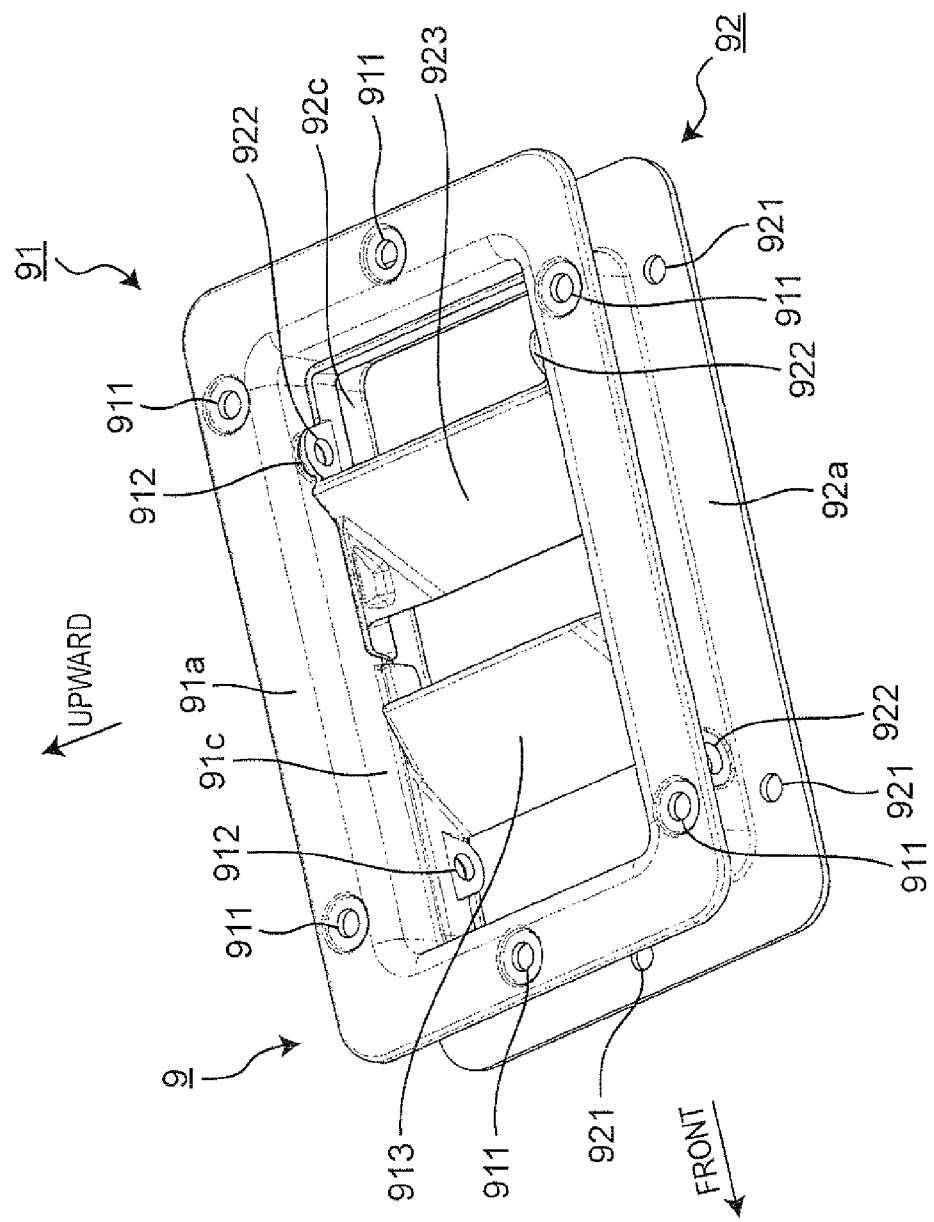
FIG. 7 is a perspective view showing a state where the outer surface member and the inner surface member are coupled to each other.

FIG. 7 is a perspective view showing a state where the outer surface member 91 and the inner surface member 92 are attached to the flat portion 63a and are coupled to each other. FIG. 7 does not show the flat portion 63a. As shown in FIGS. 5 to 7, attached to the edges 91c and 92c are fins 913 and 923 that are extended backward and slanted from inside to outside the vehicle in the state where the outer surface member 91 and the inner surface member 92 are attached to the flat portion 63a. Specifically, the fins 913 and 923 have upper and lower ends fixed to the edges 91c and 92c, respectively.

The fin 913 is attached to the edge 91c at a position in the front half of the opening 91b in the state where the outer surface member 91 is attached to the flat portion 63a such that the fins 913 and 923 do not contact with each other in the openings 91b and 92b in the state where the outer surface member 91 and the inner surface member 92 are attached to the flat portion 63a. The outer surface member 91 and the inner surface member 92 are configured as the identical members. When the fin 913 is attached to the edge 91c as described above, the fin 913 is located in the front half and the fin 923 is located in the rear half in the openings 91b and 92b in the state where the outer surface member 91 and the inner surface member 92 are attached to the flat portion 63a.

Some of the holes 912 and 922 provided for coupling between the outer surface member 91 and the inner surface member 92 are located adjacent to the fins 913 and 923 in the edges 91c and 92c, respectively.

The embodiment described above exemplifies the ventilation member 9 that is attached to the (left) front door 6. The (right) front door 6 and the (left) front door 6 are configured as the identical members as described above. Obviously, the ventilation member 9 can thus be similarly attached to the (right) front door 6.

The front door 6 of the utility vehicle 1 thus configured can achieve the following effects.

(1) The outer surface member 91 and the inner surface member 92 are provided, in the openings 91b and 92b, with the fins 913 and 923, respectively, so as to achieve promoted ventilation via the ventilation member 9 and effectively prevent heat retention in the utility vehicle 1.

(2) The outer surface member 91 and the inner surface member 92 of the ventilation member 9 are configured as the identical members. The outer surface member 91 and the inner surface member 92 can thus be produced using an identical cast to reduce production cost for the outer surface member 91 and the inner surface member 92. The identical member is applicable as any one of the outer surface member 91 and the inner surface member 92, so that the outer surface member 91 and the inner surface member 92 can be utilized effectively.

(3) The outer surface member 91 and the inner surface member 92 are provided, in the openings 91b and 92b, with the fins 913 and 923, respectively, so as to inhibit any object from projecting from inside to outside the utility vehicle 1 through the openings 91b and 92b.

(4) The fins 913 and 923 are attached to the openings 91b and 92b so as to be extended backward and slanted from inside to outside the front door 6 in the state where the ventilation member 9 is attached. The fins 913 and 923 thus achieve further promoted ventilation via the ventilation member 9 while the utility vehicle 1 is traveling.

(5) The opening 63b, to which the ventilation member 9 is attached, is provided in the flat portion 63a in the middle section 6b. The ventilation member 9 can thus be attached easily.

(6) The front door 6 has the symmetrical shape with respect to its center in the vehicle width direction so as to be applicable as either a right door or a left door. The right door and the left door can thus be produced using an identical cast to reduce production cost for the doors. Furthermore, the door is applicable to both of the left door and the right door, so that the door can be utilized effectively.

(7) The rear door 7 has the symmetrical shape with respect to its center in the vehicle width direction so as to be applicable as either a right door or a left door. The right door and the left door can thus be produced using an identical cast to reduce production cost for the doors. Furthermore, the door is applicable to both of the left door and the right door, so that the door can be utilized effectively.

(8) The outer surface member 91 and the inner surface member 92 are directly coupled to each other by the rivets penetrating the holes 912 and 922 at these positions. The ventilation member 9 can be improved in entire structural strength in comparison to a case where the outer surface member 91 and the inner surface member 92 are simply attached to the flat portion 63a of the front door 6.

(9) Some of the holes 912 and 922 provided for coupling between the outer surface member 91 and the inner surface member 92 are located adjacent to the fins 913 and 923 in the edges 91c and 92c, respectively. The fins 913 and 923 can thus be improved in strength at the coupled portions between the outer surface member 91 and the inner surface member 92.

(10) The fins 913 and 923 have the upper and lower ends fixed to the edges 91c and 92c so as to be stably held in the openings 91b and 92b, respectively.

The outer surface member 91 and the inner surface member 92 according to the above embodiment are each provided in the opening with the single fin 913 or 923. The number of the fin is not limited to one. Alternatively, the outer surface member 91 and the inner surface member 92 can each be provided with two or more fins. The fins are disposed in the openings 91b and 92b so as not to be in contact with each other in the state where the outer surface member 91 and the inner surface member 92 are coupled to each other.

The ventilation member according to the above embodiment is attached to the flat portion 63a in the middle section 6b. Alternatively, the upper section 6a or the lower section 6c can have a flat portion provided with an opening to which the ventilation member 9 is attached. Still alternatively, the ventilation member 9 can be attached to each of the upper section 6a, the middle section 6b, and the lower section 6c. In the case where the single ventilation member 9 is provided, the ventilation member 9 is preferably attached to the middle section 6b that is located at the vertically intermediate position.

The ventilation member 9 according to the above embodiment is attached to the front door 6. Alternatively, the ventilation member 9 can be attached to each of the front door 6 and the rear door 7, or can be attached only to the rear door 7. Similarly to the front door 6, the rear door 7 integrally includes the upper section, the middle section, and the lower section. As described above, the upper section, the middle section, or the lower section can have a flat portion provided with an opening to which the ventilation member 9 is attached. Still alternatively, the ventilation member 9 can be attached to each of the upper section, the middle section, and the lower section. In the case where the single ventilation member 9 is provided, the ventilation member 9 is preferably attached to the middle section that is located at the vertically intermediate position.

The holes 912 and 922 provided for coupling between the outer surface member 91 and the inner surface member 92 are provided in the edges 91c and 92c so as to penetrate vertically in the above embodiment. Alternatively, the holes 912 and 922 can be provided so as to penetrate in the anteroposterior direction.

The above embodiment exemplifies the case where the ventilation member 9 is applied to the front door 6 of the utility vehicle 1. The ventilation member according to the present invention is applicable to a door of a utility vehicle as well as to any wall member having a wall opening.

The present invention can be modified or changed in various manners without departing from the spirit and scope of the present invention recited in the following patent claims.

The invention claimed is:

1. A ventilation member attached to a wall member having a wall opening, the ventilation member comprising:
   an outer surface member attached to an outer surface of the wall member to cover the wall opening; and
   an inner surface member attached to an inner surface of the wall member to cover the wall opening and coupled to the outer surface member; wherein
   the outer surface member and the inner surface member are configured as identical members and each have an opening and at least one fin provided in the opening.

2. The ventilation member according to claim 1, wherein in a state where the ventilation member is attached, the fin is attached to the opening to be extended backward and slanted from inside to outside the wall member.

3. The ventilation member according to claim 1, wherein the wall member is a door of a utility vehicle.

4. A door of a utility vehicle to which the ventilation member according to claim 1 is attached, wherein
   the wall opening is provided in a flat portion located in a vertical center of the door.

5. The door of a utility vehicle according to claim 4, wherein
   the door has a symmetrical shape with respect to a center in a vehicle width direction to be applicable as either a right door or a left door.

* * * * *